US006956682B2

(12) United States Patent
Wooley

(10) Patent No.: US 6,956,682 B2
(45) Date of Patent: Oct. 18, 2005

(54) METHOD FOR DESIGNING PROGRESSIVE ADDITION LENSES

(75) Inventor: C. Benjamin Wooley, Roanoke, VA (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 0 days.

(21) Appl. No.: 10/606,391

(22) Filed: Jun. 26, 2003

(65) Prior Publication Data

US 2004/0263778 A1 Dec. 30, 2004

(51) Int. Cl.[7] .................................................. G02C 7/02
(52) U.S. Cl. ....................................................... 359/177
(58) Field of Search ................................ 351/159, 161, 351/169, 177

(56) References Cited

U.S. PATENT DOCUMENTS

| 2,878,721 | A |   | 3/1959  | Kanolt |   |
|-----------|---|---|---------|--------|---|
| 4,606,626 | A |   | 8/1986  | Shinohara |   |
| 6,142,624 | A | * | 11/2000 | Morris et al. | ............... 351/159 |
| 6,149,271 | A | * | 11/2000 | Menezes et al. | ............ 351/169 |
| 6,382,789 | B1 |  | 5/2002  | Baudart et al. |   |

FOREIGN PATENT DOCUMENTS

| EP | 0 295 849       | 12/1988 |
| EP | 0 978 751       | 2/2000  |
| WO | WO 02/061496 A2 | 6/2002  |

OTHER PUBLICATIONS

PCT International Search Report, dated Oct. 25, 2004, for PCT Appln. No. PCT/US2004/018913.

* cited by examiner

*Primary Examiner*—Scott J. Sugarman
*Assistant Examiner*—Darryl J. Collins

(57) ABSTRACT

The invention provides a method for designing progressive surfaces and lenses produced using image blur to construct a merit function. The shape of a lens surface, or surfaces, is arbitrarily defined and optimized to minimize the image blur based merit function.

12 Claims, 12 Drawing Sheets

METHOD FOR DESIGNING PROGRESSIVE ADDITION LENSES

FIELD OF THE INVENTION

The present invention relates to methods for designing progressive addition lenses. In particular, the invention provides a method for optimizing designs of progressive addition lenses using image blur. The invention also provides a method for simultaneously optimizing multiple progressive surfaces of a lens.

BACKGROUND OF THE INVENTION

The use of ophthalmic lenses for the correction of ametropia is well known. For example, multifocal lenses, such as progressive addition lenses ("PALs"), are used for the treatment of presbyopia. The progressive surface of a PAL provides far, intermediate, and near vision in a gradual, continuous progression of increasing dioptric power from far to near focus.

Any number of methods for designing and optimizing progressive surfaces are known. These methods are disadvantageous in that the lens performance is defined in terms of surface aberrations, namely surface astigmatism and mean power error, surface form, or both surface aberrations and form. Optimizing lens performance based upon surface calculations results in a lens that will not perform optimally in conjunction with the eye. Additionally, by limiting the surface shapes to a particular mathematical form, the optimum form of the design cannot be achieved. Still further, by optimizing the lens performance using surface aberrations, optimization of a PAL having more than one progressive addition surfaces requires optimization of each surface separately limiting the designer's ability to balance the aberration contributions from each of the surfaces to provide the best possible overall lens performance.

DESCRIPTION OF THE INVENTION AND ITS PREFERRED EMBODIMENTS

Figure 1:
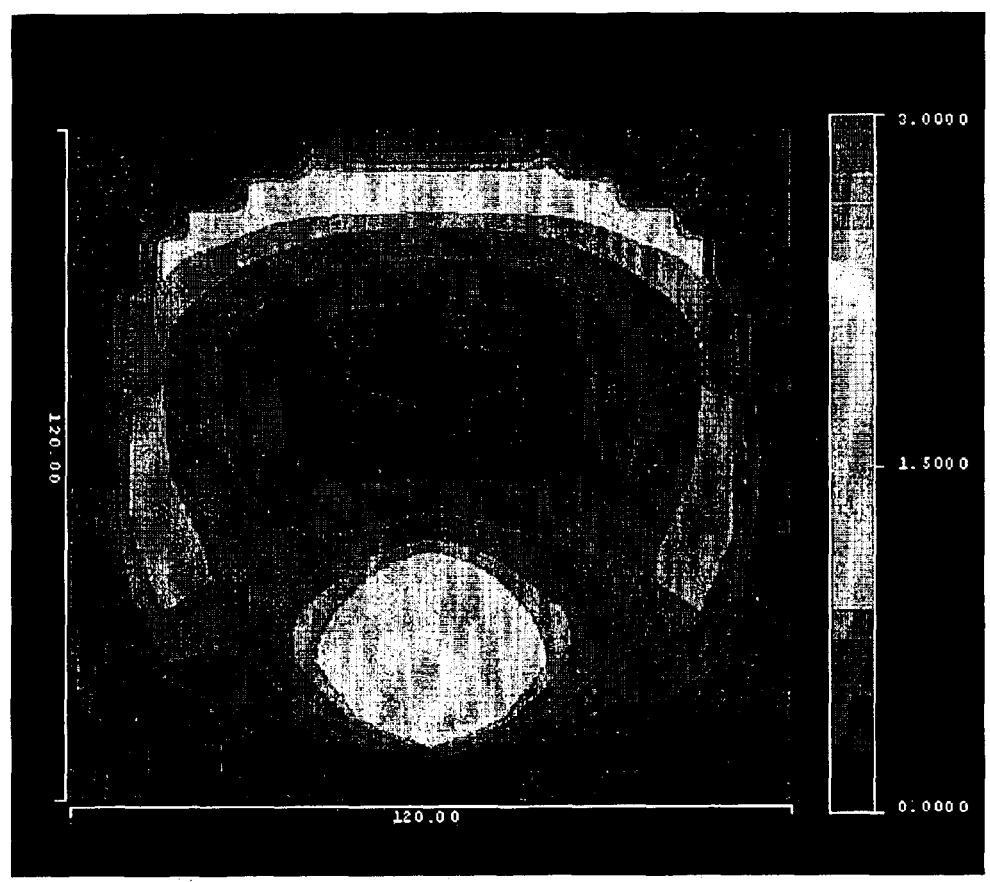
FIG. 1 is an iso-plot showing the add power of the lens of Example 1.

In the present invention, a method for designing progressive surfaces and lenses produced by the method are provided. The method of the invention uses image blur to construct a merit function. The shape of a lens surface, or surfaces, is arbitrarily defined and optimized to minimize the image blur based merit function.

In one embodiment, the invention provides a method for designing a progressive addition lens, comprising, consisting essentially of, and consisting of a.) describing a progressive addition surface; and b.) optimizing the surface using a merit function of the formula:

$$MF = MF_{blur} + MF_{power} + MF_{other}$$

wherein:

$MF_{blur}$ is a merit function that controls image blur;
$MF_{power}$ is a merit function that controls the mean sphere power; and
$MF_{other}$ is a merit function that controls constraints on cosmetics and manufacturability.

For purposes of the invention, by "progressive addition lens" is meant a lens that has at least one progressive addition surface. By "progressive addition surface" or "progressive surface" is meant a continuous, aspheric surface having far and near vision zones and an intermediate vision zone of increasing or decreasing dioptric power connecting the far and near vision zones.

In the first step of the method of the method of the invention, the surface is described. The surface may be described, or represented, as continuous, differentially continuous, or twice differentially continuous. The coefficients used to describe the surface must control the surface locally, rather than globally, to allow the surface shape to be optimized in small local areas. The shape that the surface may take is limited only by the density of the elements or coefficients used to describe the surface. Optionally, the surface representation may force symmetry.

The preferred surface description is of a rotationally symmetric, base aspheric surface and takes the form:

$$sag_{x,y} = Delta_{x,y} + \frac{c \cdot r^2}{1 + [1 - (1+k) \cdot c^2 \cdot r^2]} + \alpha_1 \cdot r^2 + \alpha_2 \cdot r^4 + \alpha_3 \cdot r^6 + \alpha_4 \cdot r^8 + \ldots \quad (I)$$

wherein:

c is the surface curvature;
r is the radial distance from the optical axis, or lens center;
k is the conic constant;
$\alpha1$, $\alpha2$, $\alpha3$, and $\alpha4$ are coefficients; and
$Delta_{x,y}$ is a delta sag that is a function of x and y.

$Delta_{x,y}$ may be represented by any of a number of methods. For example, the surface may be divided into polygon-shaped segments and the surface over each segment may be represented as a polynomial applying the appropriate boundary conditions. The size of the polygon-shaped segments may be varied to give arbitrarily fine resolution to the shape definition. Alternatively, the surface may be represented by x, y, z points that are fit to a bi-cubic spline. As another alternative, the spline coefficients themselves can be used as the coefficients that represent the surface. As yet another alternative, the surface can be represented by x, y, and slope values, which are then fit to a bi-cubic spline. Alternatively, non-uniform rational b-splines, or NURBS, or Bezier curves may be used. In each case, however, there must be a coefficient or several coefficients that control the shape of the surface locally without impacting the entire surface.

In the second step of the method of the invention, the surface is optimized using the merit function of the formula:

$$MF = MF_{blur} + MF_{power} + MF_{other} \quad (II)$$

The first portion of the merit function, $MF_{blur}$, controls the image quality. The image quality is defined in terms of a measure of image blur, as seen by the eye with the eye being rotated about the eye point, to view through each portion of the lens. The eye point typically is located about 25 to 27 mm behind the lens.

At the focus of the perfect lens, the image blur may be calculated as, and preferably is calculated as, the RMS spot size. Alternatively, other image blur measures may be used including, without limitation, RMS spot size in x plus RMS spot size in y, Strehl ratio, Acutance, or the like. A convenient means for calculating the image blur is to simulate the eye by placing a lens that does not provide any aberrations, a "perfect" lens, at the eye point with a focal length of about 15–20 mm. The perfect lens is then rotated about the eye point. Alternatively, a more sophisticated eye model can be used such as the Gullstrand schematic eye model, which model permits calculation of the image blur on the retina. Calculation of image blur for purposes of the invention may be carried out using commercially available software including, without limitation, CodeV™, OSLO™, and ZEMAX™.

Using RMS spot size, the image blur portion of the merit function is given by:

$$MF_{blur} = \sum_{\theta_x} \sum_{\theta_y} Wrms_{\theta_x,\theta_y} (RMS_{\theta_x,\theta_y})^2 \qquad (III)$$

wherein:
$\theta_x$ is the horizontal eye rotation angle;
$\theta_y$ is vertical eye rotation angle;
$RMS_{\theta_x,\theta_y}$ is the RMS spot size calculated at the image of the eye lens; and
$Wrms_{\theta_x,\theta_y}$ is the weight for the field position that allows the merit function to be tailored to provide greater emphasis on the image quality through particular portions of the lens.

The blur portion of the merit function will control the sharpness of the image. An additional term may be added to control the skew distortion, if desired.

$MF_{power}$ controls the mean sphere power through each portion of the lens. For a progressive lens, there is a desired or target sphere power $P_{\theta_x,\theta_y}$ that depends upon the eye rotation angles $\theta_x$ and $\theta_y$. The actual sphere power is $\Phi_{\theta_x,\theta_y}$. The merit function for the mean sphere power may be determined according to the following Equation III:

$$MF_{power} = \sum_{\theta_x} \sum_{\theta_y} W\phi_{\theta_x,\theta_y} \cdot (\Phi_{\theta_x,\theta_y} - P_{\theta_x,\theta_y})^2 \qquad (IV)$$

wherein:
$W\phi_{\theta_x,\theta_y}$ is the weighting for that particular field point on the power error.

The relative weighting is generally higher in the near and far vision zones and along the vertical meridian.

$MF_{other}$ includes targets or constraints that address cosmetic or manufacturability issues. Cosmetic issues may include, without limitation, maximum edge thickness, base curve selection, and other parameters of the lens that may impact the appearance of the lens on eye. Manufacturability issues include, without limitation, minimum edge thickness, maximum surface gradients, maximum gradient changes over a given distance, and other lens parameters that are affected and may be limited by the lens manufacturing process. This third portion of the merit function is given in the Equation:

$$MF_{other} = MF_{cosmetics} + MF_{manufacturability} \qquad (V)$$

There is an interaction between the merit function and the surface description representation that places requirements on the angular separation between the various angles $\theta_x$ and $\theta_y$. If the angular sampling of the lens by the merit function is too coarse, relative to the localized surface profile that is controlled by the surface coefficients, then the merit function may be minimized yet the lens performance at angular positions which fall between the angles $\theta_x$ and $\theta_y$ can be uncontrolled. To ensure that the performance of the lens is consistent between angular sampling points, preferably $\theta_x$ and $\theta_y$ are less than the angular separation between the lens surface areas that are substantially independently controlled by the lens surface coefficients.

The starting lens configuration for optimization of the full lens to meet all image quality, mean power, cosmetic, and manufacturing goals using the image blur based merit function will be determined by the lens material, the lens surface contours, the lens center thickness, and the lens diameter. Alternatively, the starting lens configuration may be determined by using a conventional progressive lens design method that determines the optimum progressive surface shape to give the required mean spherical power profile and that minimizes unwanted astigmatism. In this case, the final design will resemble the form of the conventional design but will have improved optical performance because it is optimized using an image blur based merit function.

The final step of the method of the invention is to determine the set of coefficients used to describe the progressive lens surface to minimize the value of the merit function. In addition to the coefficients used to describe the progressive surface, there are other optimization variables that may also be used, which include lens thickness and prism, as well as the curvature, conic constant, and aspheric terms for the non-progressive surface. The optimization methods used can included those designed to find local minimums of the merit function, such as the Powel method or the damped least squares type algorithms that are used in commercial lens design software packages. The optimization methods can also include those that are designed to find the global minimum of the merit function, such as simulated annealing or genetic algorithms. The preferred method is to combine the use of a global method, such as simulated annealing, with a local method such as damped least squares algorithm.

Alternately, and preferably, the starting lens configuration can be determined using a procedure that will provide more flexibility in altering the final design form. In this embodiment, the procedure for determining the lens starting point is to first determine the front and back spherical curves that provide the required base power, or distance vision sphere power, and that satisfy the cosmetic and mechanical constraints. This can be done by using as optimization variables the curvatures for the front and back lens surfaces and the lens thickness, and minimizing the portion of the merit function that controls the cosmetic and the manufacturing requirements, $MF_{other}$.

The lens may be optimized as a single vision lens with optimization variables including lens thickness, curvatures, and symmetric aspheric terms. In this embodiment, the merit function used will include $MF_{other}$, $MF_{rms}$, and $MF_{power}$ with the targets ($P_{\theta_x,\theta_y}$) and weights ($W\phi_{\theta_x,\theta_y}$, $Wrms_{\theta_x,\theta_y}$) adjusted to be appropriate for a single vision lens. The lens power is the base power and the goal is to provide reasonably good performance in the far vision zone.

The optimization variables then are set to include only the surface coefficients along the vertical meridian. The weights on power, $W\phi_{\theta_x,\theta_y}$, are set to zero except along the vertical meridian where they are set to the desired progressive addition profile. The power targets $P_{\theta_x,\theta_y}$ are set to give the desired progressive power profile. Upon optimization with this merit function and these coefficients, the resulting lens will meet the cosmetic and manufacturing requirements, have good performance in the far vision region, and also provide for the correct add power along the vertical axis. This lens can provide a good starting lens for optimization with the full merit function. Alternatively, the full merit function could be used with $W\phi_{\theta_x,\theta_y}$ set to the normal weights, $Wrms_{\theta_x,\theta_y}$ set to zero except along the vertical meridian, and the full surface optimized. This would provide, as a starting point, a lens that satisfies the power requirements and has image blur optimized along the meridian.

As presented, the merit function takes on the general form of being a sum of the squares of the differences between the value of a particular parameter and a target value for that parameter. One skilled in the art will realize that constraints such as a minimum curvature value can be transformed into this form, or that there are alternate methods for targeting or constraining the various parameters that make up the merit function.

The embodiments of the method heretofore described are suitable for a design of a lens with a progressive surface that is either the front surface or the back surface of the lens. However, the method of the invention may, in an alternative embodiment, be used to design a lens in which more than one surface contributes to the progressive power. In such a method of the invention, simultaneous optimization of both surfaces is permitted because the merit function is composed of measures on image blur produced by the entire lens, and not just surface aberrations.

For purposes of optimizing multiple progressive addition surfaces, the merit function may be modified to allow the relative amount of add power that is contributed by each surface as follows:

$$MF_{power} = \sum_{\theta_x}\sum_{\theta_y} W\phi_{\theta_x,\theta_y} \cdot (\Phi_{\theta_x,\theta_y} - P_{\theta_x,\theta_y})^2 + \quad (VI)$$
$$Wadd_{\theta_x,\theta_y}[(AddF_{\theta_x,\theta_y} - PF_{\theta_x,\theta_y})^2 + (AddB_{\theta_x,\theta_y} - PB_{\theta_x,\theta_y})^2]$$

wherein
$\theta_x$ is the horizontal eye rotation angle;
$\theta_y$ is vertical eye rotation angle;
$RMS_{\theta_x,\theta_y}$ is the RMS spot size calculated at the image of the eye lens;
$Wrms_{\theta_x,\theta_y}$ is the weight for the field position that allows the merit function to be tailored to provide greater emphasis on the image quality through particular portions of the lens;
$AddF_{\theta_x,\theta_y}$ is the calculated add power on the front surface;
$AddB_{\theta_x,\theta_y}$ is the calculated add power on the back surface;
$PF_{\theta_x,\theta_y}$ is the target on the add value for the front surface;
$PB_{\theta_x,\theta_y}$ is the target on the add value for the back surface; and
$Wadd_{\theta_x,\theta_y}$ is the weighting that is applied to maintaining this balance of powers.

By "add power" is meant the difference in power between the near and far vision zones of a progressive surface.

Equation VI shows the case for a lens with the add power being contributed by the front and back surfaces of the lens. The first part of the merit function is the same as Equation II and provides the overall lens mean sphere power profile. The additional terms provide targets for the add powers of the front and back surfaces. As written, one should ensure that the targets on the front add plus the back add are consistent with the total power targets.

If a lens is desired in which the contributions to the add power in the far zone take on particular values, Equation VI may be reduced to:

$$MF_{power} = Wadd_{far}[(AddF_{far} - PF_{far})^2 + (AddB_{far} - PB_{far})^2] + \quad (VII)$$
$$\left[\sum_{\theta_x}\sum_{\theta_y} W\phi_{\theta_x,\theta_y} \cdot (\Phi_{\theta_x,\theta_y} - P_{\theta_x,\theta_y})^2\right]$$

With this ability to control the relative add power contributed by the front and back surfaces, parametric design studies can be performed to determine the optimum balance of powers between the front and back surfaces.

When optimizing a lens that has both the front and back surfaces of the lens contributing to the add power, the blur portion of the merit function may be modified to:

$$MF_{blur} = \sum_{\theta_x}\sum_{\theta_y}[Wrms_{\theta_x,\theta_y} \cdot (RMS_{\theta_x,\theta_y})^2 + \quad (VIII)$$
$$Wast_{\theta_x,\theta_y} \cdot (AstF_{\theta_x,\theta_y} - AF_{\theta_x,\theta_y})^2]$$

wherein:
$AstF_{\theta_x,\theta_y}$ is either the surface astigmatism from the front surface or the contribution to the total lens astigmatism as seen by the eye from the front surface; and
$Wast_{\theta_x,\theta_y}$ are the weights placed on the unwanted astigmatism.

Equation VIII permits the amount of unwanted astigmatism along the vertical corridor contributed by the front surface to be controlled. To designate that the contribution to the merit function is only considered along the central vertical axis, $\theta_x$ is set to zero. Equation VIII can be modified to include unwanted astigmatism targets for the entire surface with $0_x$ not equal to zero, or to have the unwanted astigmatism targets to be for the back surface, but the preferred method is to target the astigmatism along the central vertical corridor for the front surface.

Alternate optimizations may be derived by selectively relaxing the boundary conditions between the polygon elements that are used to describe the progressive surface. For example, it may be specified that the first and second derivatives of the surface are not strictly 0, but may introduce a minimal level of prism and oblique astigmatism. The maximum values of the derivatives may be specified in order to ensure that the discontinuites introduced at the boundaries are imperceptible. These maximum values may be varied according to the location of each segment, which also affects the assigned weight. A trade-off between optical aberrations caused by astigmatism and higher order aberration on the one hand and prism on the other is especially useful in deriving improved optimizations of the overall progressive addition lens design.

Conventional progressive addition lens design techniques require that the unwanted astigmatism along the vertical corridor be less than a prescribed amount, generally less than 0.25 diopters. By "unwanted astigmatism" is meant undesired astigmatism that is introduced or caused by one or more of the lens' surfaces. When more than one surface contributes to the progressive nature of the lens, each surface is constrained to have a small amount of unwanted astigmatism so that the total amount of unwanted astigmatism for both surfaces is less than 0.25 diopters. In the method of the invention, the unwanted astigmatism contribution from one surface may be greater than about 0.25 diopters because the method allows for the simultaneous optimization of multiple progressive surfaces. The unwanted astigmatism of one surface may be compensated for by the other surface. For example, a positive contribution to unwanted astigmatism of greater than 0.25 diopters along the vertical corridor can be compensated for by a negative contribution from the back surface. Thus, in another embodiment, the invention provides a progressive addition lens comprising, consisting essentially of, and consisting of a first and a second progressive addition surface, wherein the unwanted astigmatism for the first progressive addition surface is greater than about 0.25 diopters.

Additionally, the method of the present invention is advantageous in designing lenses having more than one progressive addition surface in that it permits the maximum unwanted astigmatism of the lens to be reduced to levels that are not achievable using conventional design methods. By "maximum unwanted astigmatism" is meant the highest measurable level of unwanted astigmatism in an area of unwanted astigmatism. Conventional design methods require the maximum unwanted astigmatism for each surface be minimized. In contrast, in the method of the present invention, all progressive addition surfaces are simultaneously optimized allowing the contribution to the total maximum unwanted astigmatism from one progressive surface to be compensated for by one or more of the other progressive surfaces.

Typically the maximum unwanted astigmatism for a progressive surface is minimized to be less than or equal to the contribution by that surface to the lens' add power, but not less than about 0.75 times the add power in diopters. The reason for this is that, using conventional design techniques, it is difficult to reduce the maximum unwanted astigmatism below 0.75 times the add power and to obtain a progressive power profile that is acceptable for a progressive lens. For example, for a 2.0 diopter add surface the maximum unwanted astigmatism for that surface is typically between about 1.5) and 2.0 diopters.

However, in a lens designed in accordance with the invention, the maximum unwanted astigmatism for a single surface may be greater than the add power for that surface because this unwanted astigmatism can be compensated for by simultaneous optimization of a second progressive surface of the lens. Thus, in yet another embodiment, the invention provides a progressive addition lens comprising, consisting essentially of, and consisting of a first progressive addition surface having a first add power and a second progressive addition surface having a second add power, wherein a maximum unwanted astigmatism of the first progressive surface is greater than the first add power.

Additionally, if the maximum unwanted astigmatism for one of the surfaces is less than the add power for that surface, the total lens maximum astigmatism can be reduced by the methods of the invention by using the second PAL surface to compensate for the maximum unwanted astigmatism from the other surface. Thus, the total lens maximum astigmatism using the methods of the present invention can be less than about 0.75 times the lens' add power and preferably about 0.5 times the lens' add power.

The invention will be clarified further by a consideration of the following, non-limiting examples:

EXAMPLES

Example 1

Figure 2A:
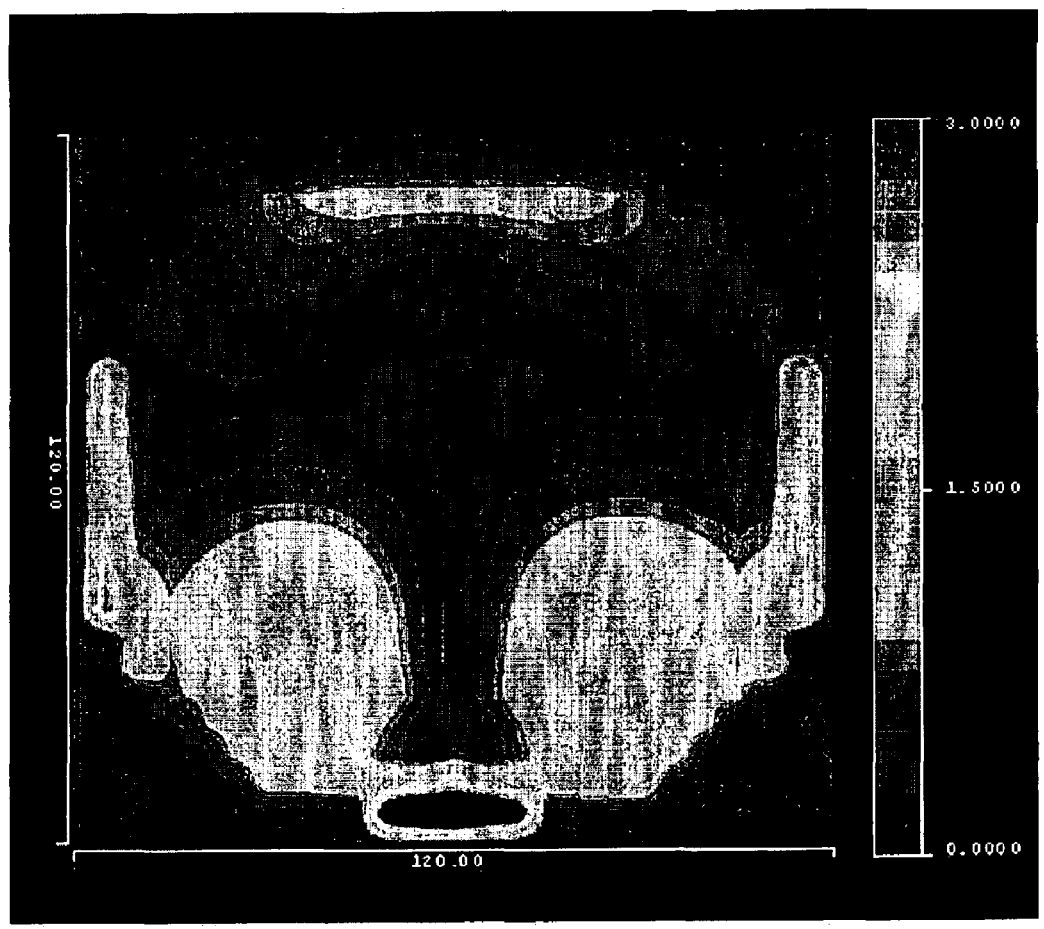
FIGS. 2a and 2b are iso-plots showing the unwanted astigmatism of the lens of Example 1.
Figure 2B:
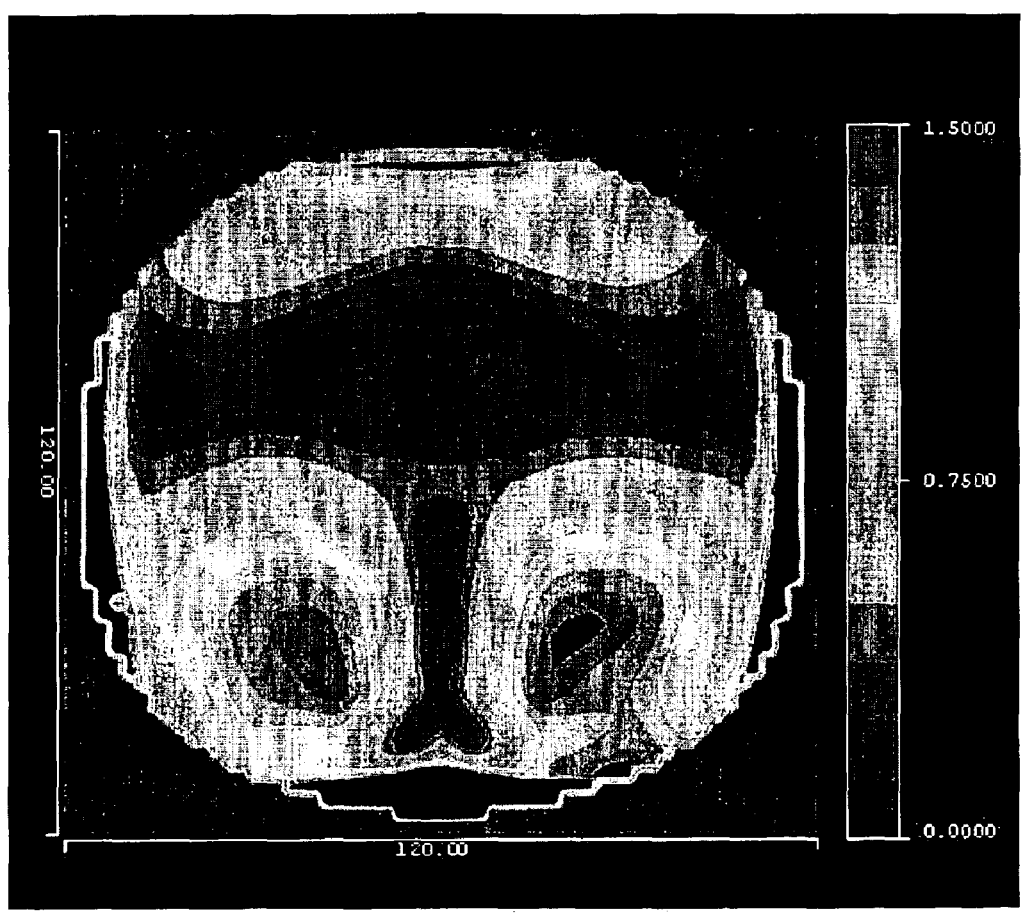
Figure 3A:
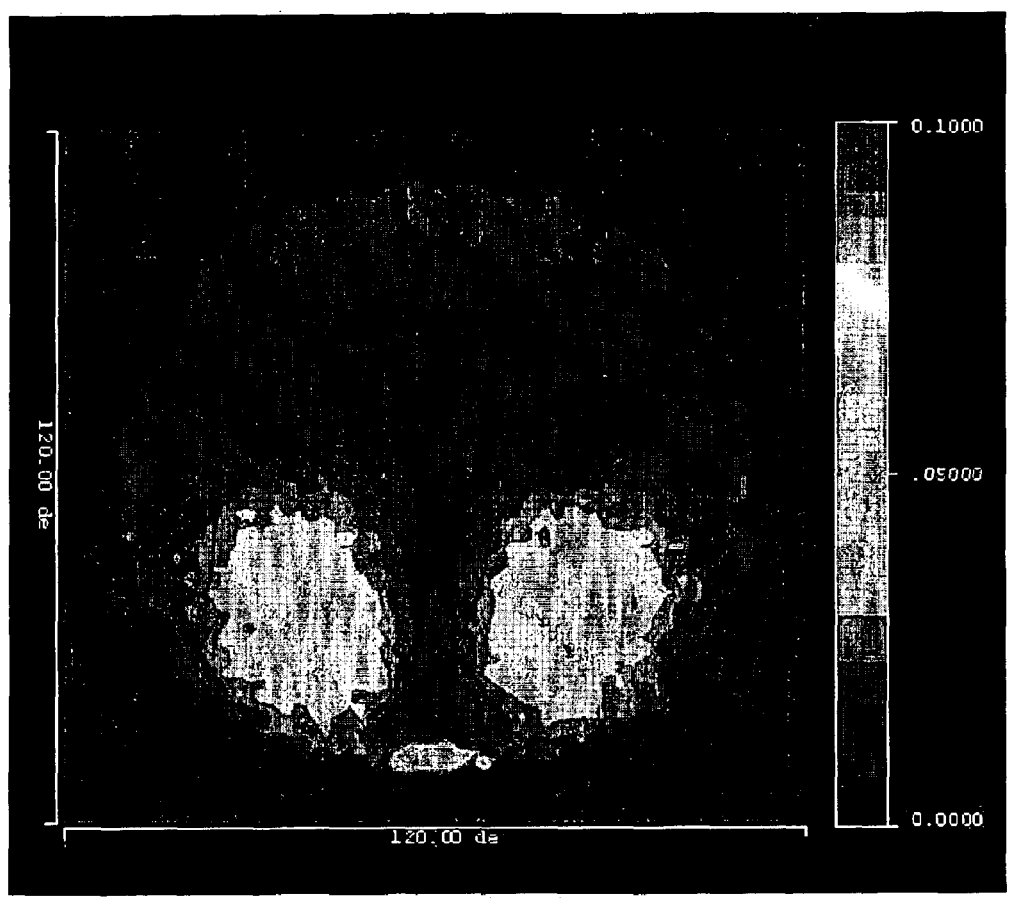
FIGS. 3a and 3b are iso-plots showing the RMS spot size for a simulated eye for the lens of Example 1.
Figure 3B:
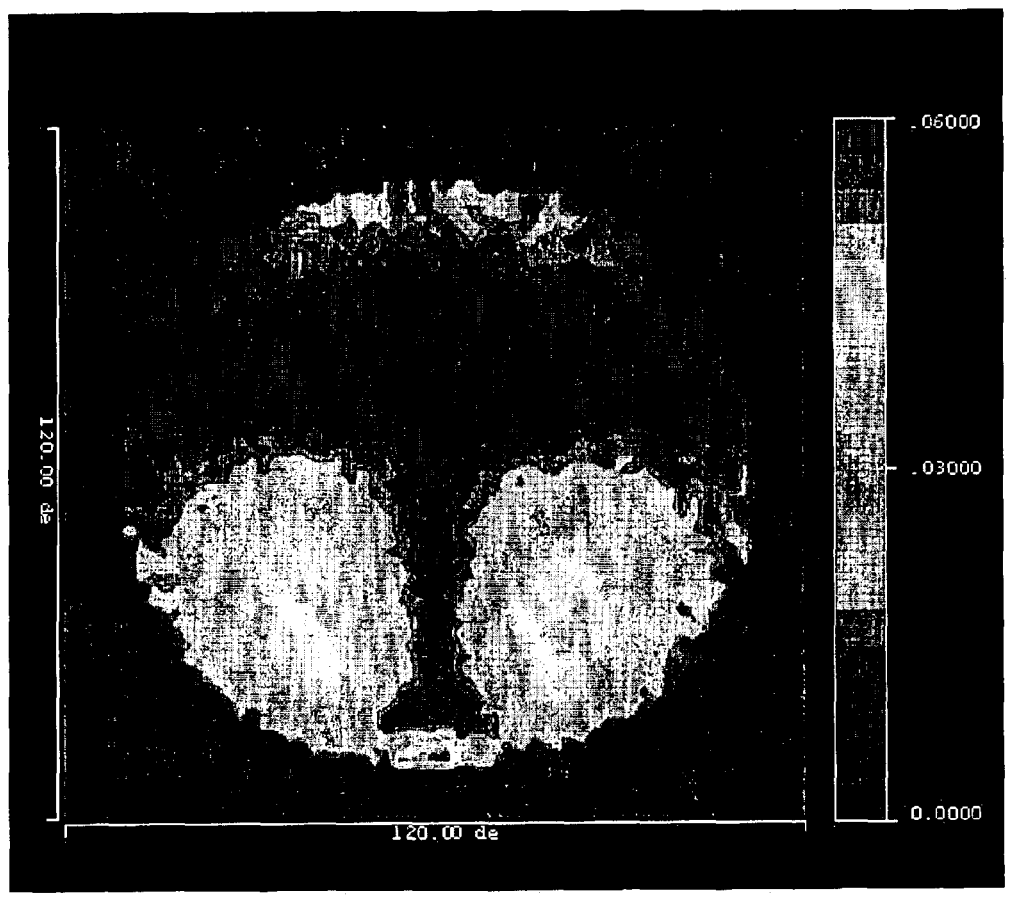

A baseline example of a lens having two progressive surfaces is provided, which lens has a portion of the total add power on each of the lens surfaces. Additionally, the peaks of the unwanted astigmatism on each of the surfaces were misaligned as described in U.S. Pat. No. 6,149,271. FIGS. 1 through 3 show the add power, the unwanted astigmatism, and the RMS spot size. The plots are from −60 to 60 degrees. The lens diameters in these plots are 60 mm. This, and all subsequent designs have −4.0 diopters of sphere power and 2.0 diopters of add power.

Example 2

A lens having two progressive surfaces was provided using the method of this invention. The lens has a sphere power of −4.0 diopters and 2.0 diopters of add power. The surfaces of the lens were determined by the coefficients of equations of the form of Equation I. The front surface was defined by a base curvature c and a conic constant k and the remainder of the rotationally symmetric aspheric terms are zero. Delta$_{xy}$ was defined by sets of bi-cubic spline coefficients for a 4 by 8 point grid of evenly spaced points that define the right half of the lens. The lens has a left-right symmetry. The back surface of the lens was defined by a similar function with the conic constant k on the back surface being 0.

A best fit of the function used to represent the surfaces was made to the surfaces for the baseline design of Example 1. This provided a starting point for the simultaneous optimization of the two surfaces using the method of the invention. The optimization was performed using a damped least square-type optimization algorithm with optimization variables being the conic constant on the front surface (the base curvature was kept constant), the curvature of the back surface, and the spline coefficients for the front and back surfaces. The merit function used to optimize the lens included sphere power contributions of the form of Equation IV and image blur contributions of the form of Equation VIII. The lens was sampled in angle ($\theta_x$, $\theta_y$) at 21 points that were nearly equally spaced on the surface of the lens taking advantage of the left-right symmetry.

The target sphere power $P_{\theta x, \theta y}$ was set to be the actual sphere power of the lens of Example 1. The weighting factors $W\phi_{\theta x, \theta}$ were given the following values relative to a value of 1.0 at the distance reference point. At the near reference point at which the add power is calculated, the relative value was 100. At points along the central horizontal corridor of the lens between the near and distance reference points, the value was set to 5. At points in the field, the weighting factor was set to 0.1.

Figure 4:
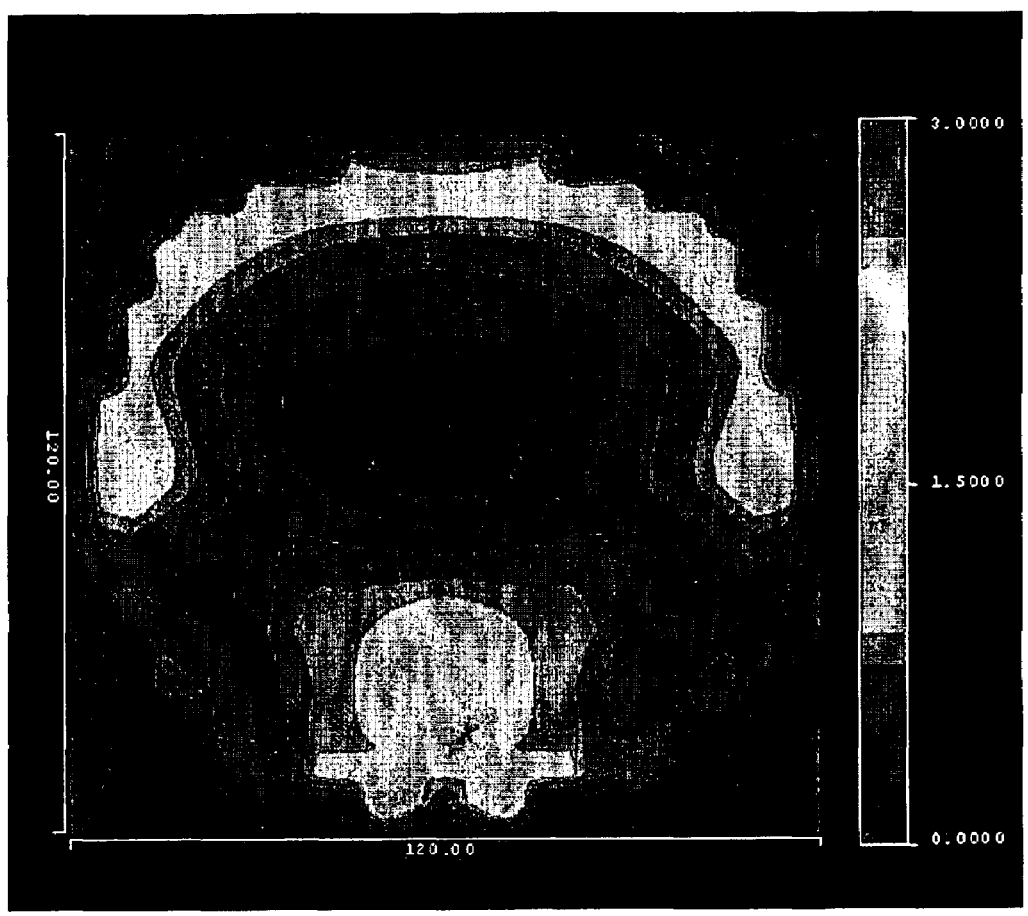
FIG. 4 is an iso-plot showing the add power of the lens of Example 2.
Figure 5:
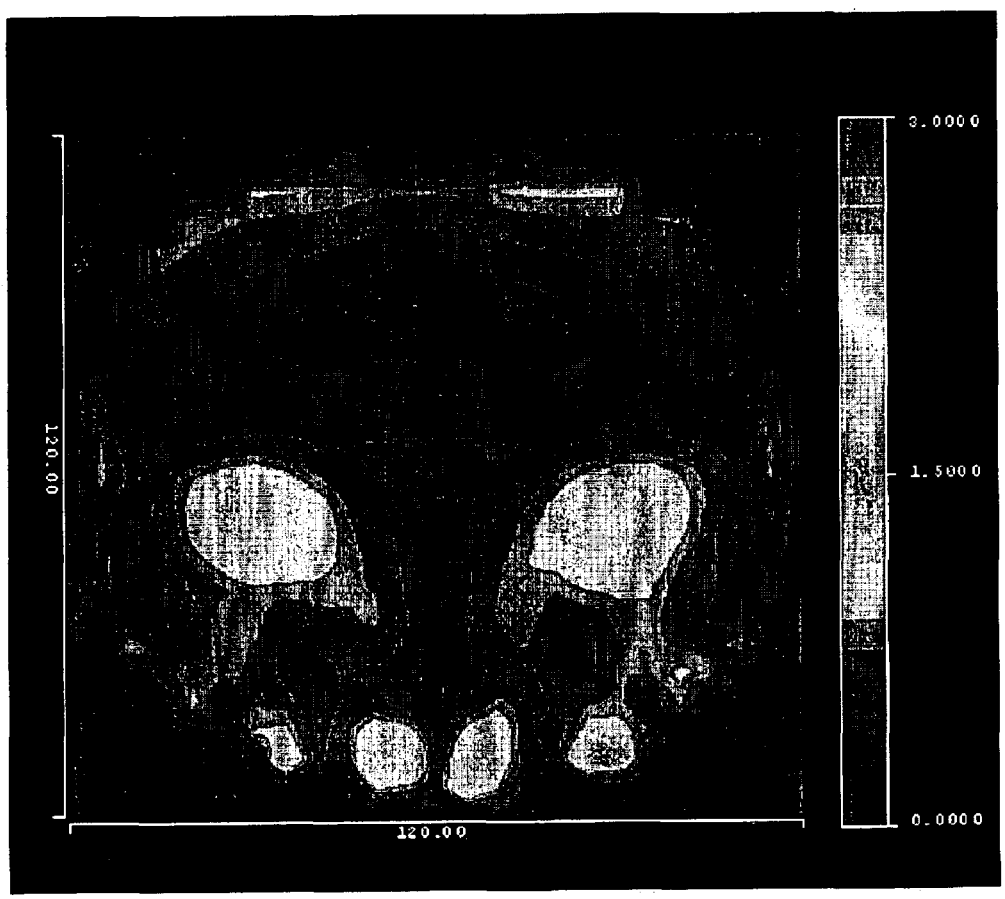
FIG. 5 is an iso-plot showing the unwanted astigmatism of the lens of Example 2.
Figure 6:
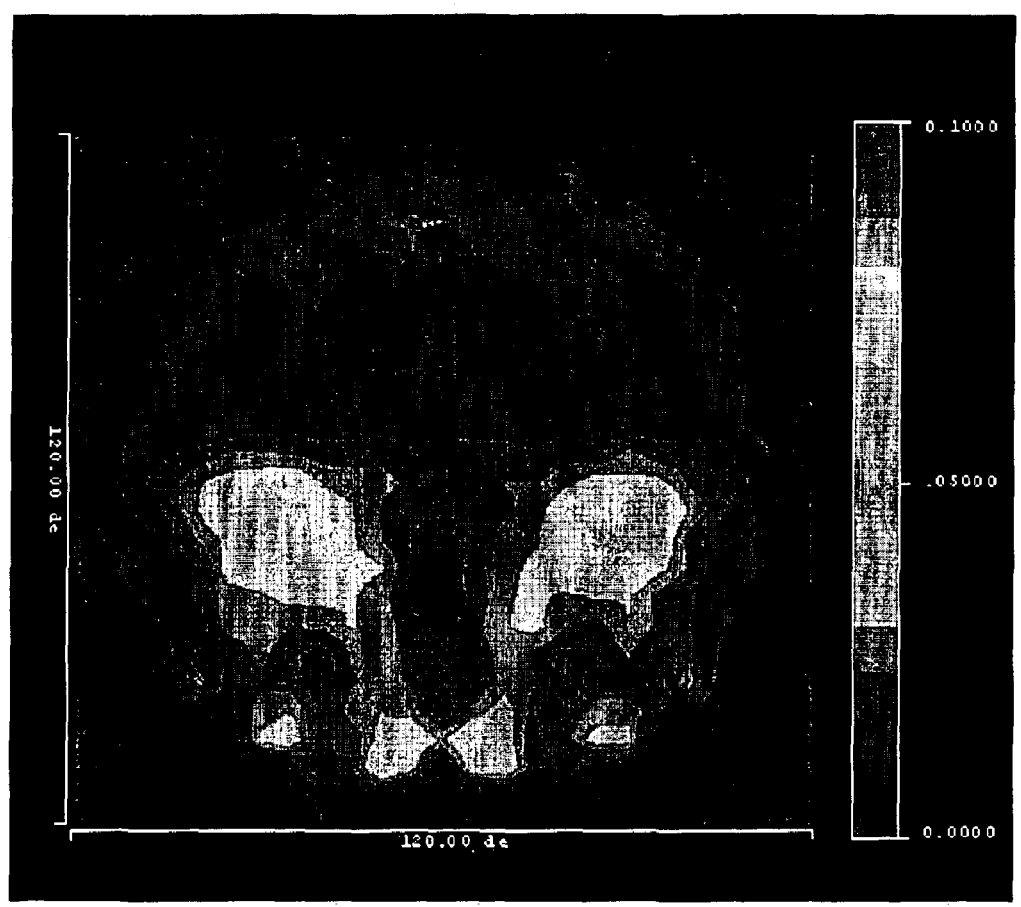
FIG. 6 is an iso-plot showing the RMS spot size for a simulated eye for the lens of Example 2.

The blur function contribution to the merit function of the form of Equation VIII was used with the relative weightings of the RMS spot size portion of the merit function Wrms$_{\theta x, \theta y}$ adjusted to be 10 times the contribution to the merit function based on the contributions from the unwanted astigmatism Wast$_{\theta x, \theta y}$ along the central, vertical corridor. The weights Wrms$_{\theta x, \theta y}$ along the central, vertical corridor are 2 times the values away from the corridor and the weights Wast$_{\theta x, \theta y}$ along the central, vertical corridor are 20 times the values away from the corridor. FIGS. 4 through 6 show a summary of the performance results of the lens.

Comparison of both the unwanted astigmatism and the RMS spot size shows lower maximum values as well as wider near and intermediate zones when compared with the results shown in FIGS. 1 through 3 for the baseline design. In Example 2, the maximum unwanted astigmatism for the 2.0 diopter addition lens is 1.25 Diopters.

Example 3

The lens of Example 3 has two progressive surfaces. The surfaces of this lens, the merit function, and the optimization process are the same as for Example 2 with the following exception. The blur function contribution to the merit function of Equation VIII was used with the relative weighting of the RMS spot size portion of the merit function Wrms$_{\theta x,\theta y}$ adjusted to be the same as the contribution to the merit function based upon the contributions from the unwanted astigmatism Wast$_{\theta x,\theta y}$ along the central, vertical corridor.

Figure 7:
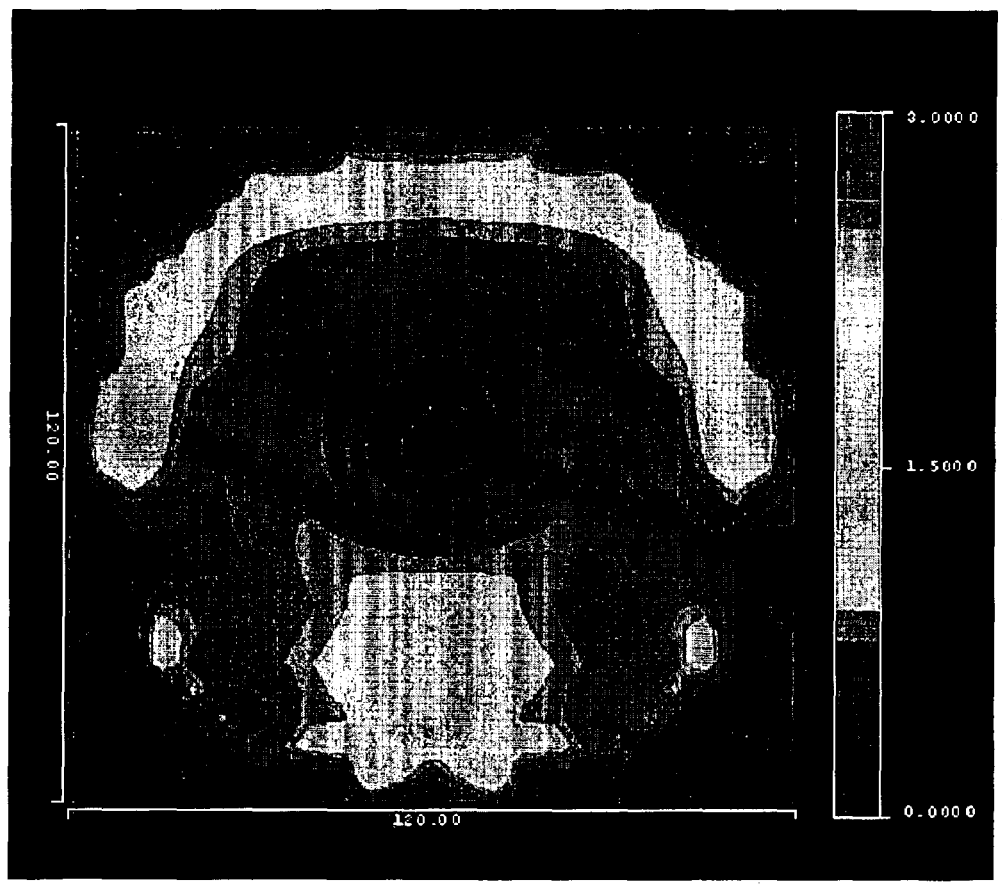
FIG. 7 is an iso-plot showing the add power of the lens of Example 3.
Figure 8A:
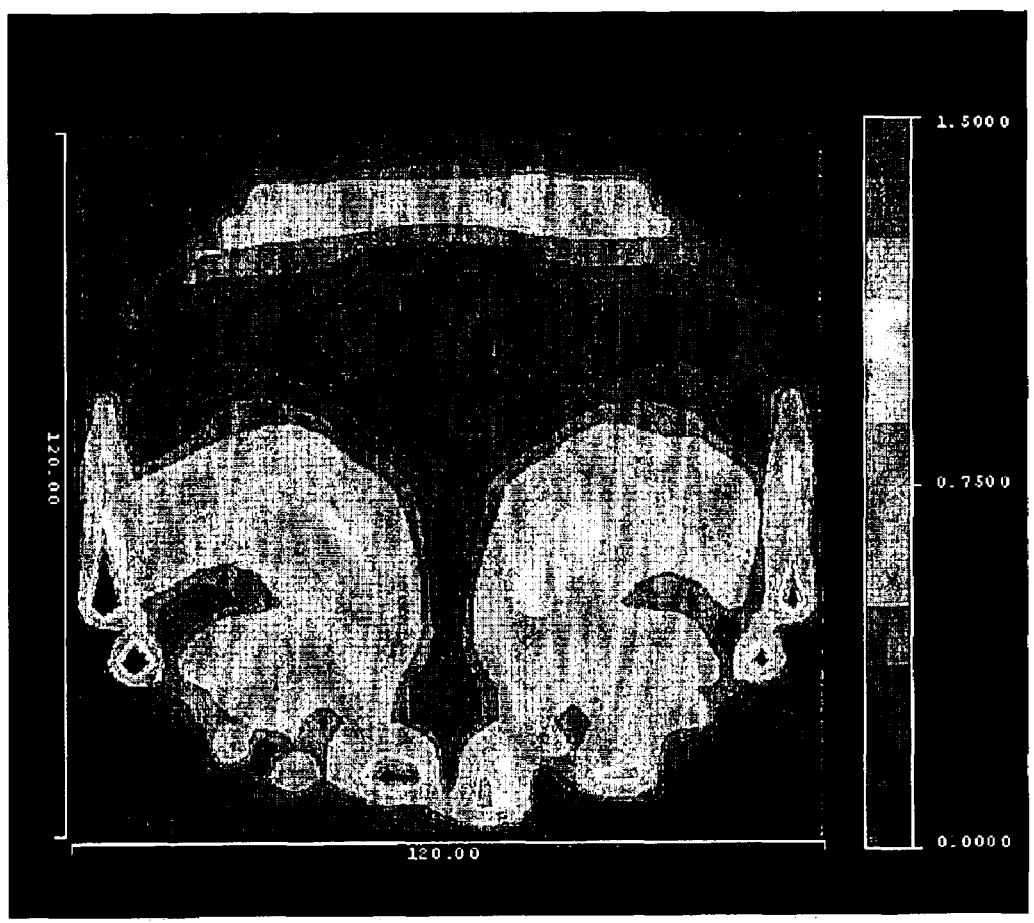
FIGS. 8a and 8b are iso-plots showing the unwanted astigmatism of the lens of Example 3.
Figure 8B:
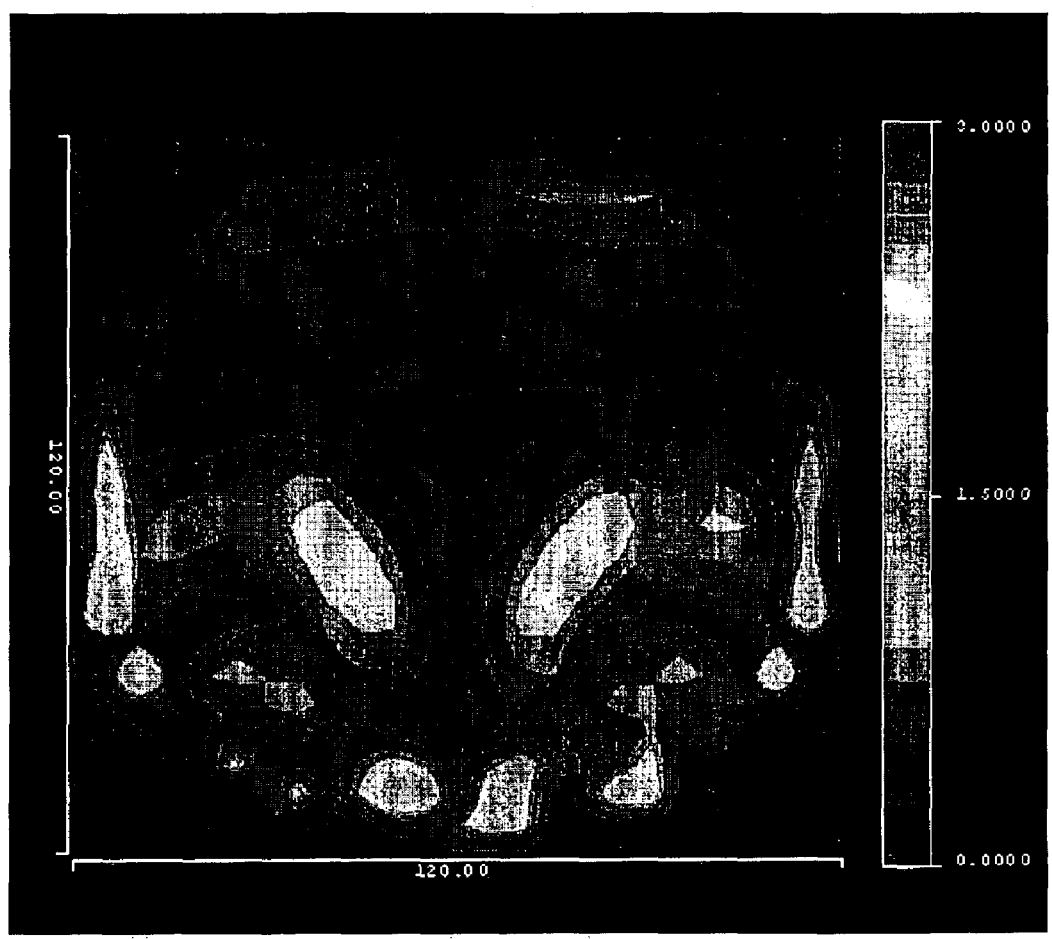
Figure 9:
FIG. 9 is an iso-plot showing the RMS spot size for a simulated eye for the lens of Example 3.

A summary of the performance of this lens is shown graphically in FIGS. 7 through 9. In this lens, the maximum unwanted astigmatism for this 2.0 diopters add power lens is approximately 0.75 diopters. Compared to a conventional PAL, this lens shows a large reduction in the maximum unwanted astigmatism and RMS spot size as well as increased near and intermediate reading zone widths.

What is claimed is:

1. A method for designing a progressive addition lens, comprising a.) describing a progressive addition surface; and b.) optimizing the surface using a merit function of the formula:

$$MF = MF_{blur} + MF_{power} + MF_{other}$$

wherein:

$MF_{blur}$ is a merit function that controls image blur;

$MF_{power}$ is a merit function that controls the mean sphere power; and $MF_{other}$ is a merit function that controls constraints on cosmetics and manufacturability wherein the surface is described as a continuous, a differentially continuous, or a twice differentially continuous surface.

2. The method of claim 1, wherein the surface is described according to the equation:

$$sag_{x,y} = Delta_{x,y} + \frac{c \cdot r^2}{1 + [1 - (1+k) \cdot c^2 \cdot r^2]} + \alpha_1 \cdot r^2 + \alpha_2 \cdot r^4 + \alpha_3 \cdot r^6 + \alpha_4 \cdot r^8 + \ldots$$

wherein:

c is a surface curvature;

r is a radial distance from an optical axis of the lens;

k is a conic constant;

$\alpha_1, \alpha_2, \alpha_3, \alpha_4$ each are a coefficient; and $Delta_{x,y}$ is a delta sag that is a function of x and y.

3. A method for designing a progressive addition lens, comprising a.) describing at least two progressive addition surfaces; and b.) optimizing the surfaces using merit functions of the formula:

$$MF = MF_{blur} + MF_{power} + MF_{other}$$

wherein:

$MF_{blur}$ is a merit function that controls image blur;

$MF_{power}$ is a merit function that controls the mean sphere power; and $MF_{other}$ is a merit function that controls constraints on cosmetics and manufacturability.

4. The method of claim 3, wherein the surfaces are each independently described as a continuous, a differentially continuous, or a twice differentially continuous surface.

5. The method of claim 3, wherein the surfaces are each described according to the equation:

$$sag_{x,y} = Delta_{x,y} + \frac{c \cdot r^2}{1 + [1 - (1+k) \cdot c^2 \cdot r^2]} + \alpha_1 \cdot r^2 + \alpha_2 \cdot r^4 + \alpha_3 \cdot r^6 + \alpha_4 \cdot r^8 + \ldots$$

wherein:

c is a surface curvature;

r is a radial distance from an optical axis of the lens;

k is a conic constant;

$\alpha_1, \alpha_2, \alpha_3, \alpha_4$ each are a coefficient; and $Delta_{x,y}$ is a delta sag that is a function of x and y.

6. The method of claim 3, 4, or 5, wherein $MF_{power}$ is:

$$MF_{power} = \sum_{\theta_x} \sum_{\theta_y} W\phi_{\theta_x,\theta_y} \cdot (\Phi_{\theta_x,\theta_y} - P_{\theta_x,\theta_y})^2 + Wadd_{\theta_x,\theta_y}[(AddF_{\theta_x,\theta_y} - PF_{\theta_x,\theta_y})^2 + (AddB_{\theta_x,\theta_y} - PB_{\theta_x,\theta_y})^2]$$

wherein $\theta_x$ is a horizontal eye rotation angle;

$\theta_y$ is a vertical eye rotation angle;

$RMS_{\theta x,\theta y}$ is a RMS spot size calculated at an image of an eye lens;

$Wrms_{\theta x,\theta y}$ is a weight for a field position;

$AddF_{\theta x,\theta y}$ is a calculated add power on a front surface of the lens;

$AddB_{\theta x,\theta y}$ is a calculated add power on a back surface of the lens;

$PF_{\theta x,\theta y}$ is a target for an add power value for the front surface;

$PB_{\theta x,\theta y}$ is a target for an add power for the back surface; and $Wadd_{\theta x,\theta y}$ is a weighting.

7. The method of claim 3, 4, or 5, wherein $MF_{power}$ is:

$$MF_{power} = Wadd_{far}[(AddF_{far} - PF_{far})^2 + (AddB_{far} - PB_{far})^2] + \left[\sum_{\theta_x} \sum_{\theta_y} W\phi_{\theta_x,\theta_y} \cdot (\Phi_{\theta_x,\theta_y} - P_{\theta_x,\theta_y})^2\right]$$

wherein $\theta_x$ is a horizontal eye rotation angle;

$\theta_y$ is a vertical eye rotation angle;

$RMS_{\theta x,\theta y}$ is a RMS spot size calculated at an image of an eye lens;

$Wrms_{\theta x,\theta y}$ is a weight for a field position;

$AddF_{\theta x,\theta y}$ is a calculated add power on a front surface of the lens;

$AddB_{\theta x,\theta y}$ is a calculated add power on a back surface of the lens;

$PF_{\theta x,\theta y}$ is a target for an add power value for the front surface;

$PB_{\theta x,\theta y}$ is a target for an add power for the back surface; and $Wadd_{\theta x,\theta y}$ is a weighting.

8. The method of claim 3, 4, or 5, wherein $MF_{blur}$ is:

$$MF_{blur} = \sum_{\theta_x}\sum_{\theta_y}\left[Wrms_{\theta_x,\theta_y}\cdot(RMS_{\theta_x,\theta_y})^2 + Wast_{\theta_x,\theta_y}\cdot(AstF_{\theta_x,\theta_y}-AF_{\theta_x,\theta_y})^2\right] \quad (IX)$$

wherein:
  $AstF_{\theta_x,\theta_y}$ is either the surface astigmatism from the front surface or the contribution to the total lens astigmatism as seen by the eye from the front surface; and
  $Wast_{\theta_x,\theta_y}$ are the weights placed on the unwanted astigmatism.

9. The method of claim 6, wherein $MF_{blur}$ is:

$$MF_{blur} = \sum_{\theta_x}\sum_{\theta_y}\left[Wrms_{\theta_x,\theta_y}\cdot(RMS_{\theta_x,\theta_y})^2 + Wast_{\theta_x,\theta_y}\cdot(AstF_{\theta_x,\theta_y}-AF_{\theta_x,\theta_y})^2\right] \quad (IX)$$

wherein:
  $AstF_{\theta_x,\theta_y}$ is either the surface astigmatism from the front surface or the contribution to the total lens astigmatism as seen by the eye from the front surface; and
  $Wast_{\theta_x,\theta_y}$ are the weights placed on the unwanted astigmatism.

10. The method of claim 7, wherein $MF_{blur}$ is:

$$MF_{blur} = \sum_{\theta_x}\sum_{\theta_y}\left[Wrms_{\theta_x,\theta_y}\cdot(RMS_{\theta_x,\theta_y})^2 + Wast_{\theta_x,\theta_y}\cdot(AstF_{\theta_x,\theta_y}-AF_{\theta_x,\theta_y})^2\right] \quad (IX)$$

wherein:

$AstF_{\theta_x,\theta_y}$ is either the surface astigmatism from the front surface or the contribution to the total lens astigmatism as seen by the eye from the front surface; and $Wast_{\theta_x,\theta_y}$ are the weights placed on the unwanted astigmatism.

11. The method of claim 3, further comprising c.) determining a set of coefficients to describe the lens surface to minimize e value of the merit function.

12. The method of claim 11, wherein step c.) is carried out by (i) selecting optimization variables that are a curve for a front surface and a curve for e back surface of the lens; and (ii) minimizing $MF_{other}$.

* * * * *